US009358505B2

(12) United States Patent
Cumin et al.

(10) Patent No.: US 9,358,505 B2
(45) Date of Patent: Jun. 7, 2016

(54) GAS SPARGER FOR AN IMMERSED MEMBRANE

(75) Inventors: Jeff Cumin, Hamilton (CA); Henry Behmann, Puslinch (CA); Youngseck Hong, Burlington (CA); Reid Bayly, Toronto (CA)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 920 days.

(21) Appl. No.: 12/553,346

(22) Filed: Sep. 3, 2009

(65) Prior Publication Data
US 2011/0049047 A1 Mar. 3, 2011

(51) Int. Cl.
| B01D 65/02 | (2006.01) |
| B01D 65/08 | (2006.01) |
| B01D 61/08 | (2006.01) |
| B01D 61/18 | (2006.01) |
| B01D 65/00 | (2006.01) |
| B01F 3/04 | (2006.01) |
| C02F 1/44 | (2006.01) |

(52) U.S. Cl.
CPC ............ B01D 65/08 (2013.01); B01D 61/08 (2013.01); B01D 61/18 (2013.01); B01D 65/00 (2013.01); B01D 65/02 (2013.01); B01F 3/04241 (2013.01); B01D 2313/26 (2013.01); B01D 2315/06 (2013.01); B01D 2321/185 (2013.01); B01D 2321/26 (2013.01); B01F 2003/04304 (2013.01)

(58) Field of Classification Search
CPC .... B01D 65/02; B01D 65/08; B01D 2321/18; B01D 2321/185; B01D 2321/40
See application file for complete search history.

(56) References Cited

U.S. PATENT DOCUMENTS

| 1,574,783 | A | 6/1925 | Beth |
| 3,068,655 | A | 12/1962 | Murray et al. |
| 3,246,761 | A | 4/1966 | Bryan |
| 3,592,450 | A | 7/1971 | Rippon |
| 3,628,775 | A | 12/1971 | McConnell |
| 3,847,508 | A | 11/1974 | Mowen |
| 3,898,018 | A | 8/1975 | Weis |
| 4,169,873 | A | 10/1979 | Lipert |
| 4,187,263 | A | 2/1980 | Lipert |
| 4,356,131 | A | 10/1982 | Lipert |
| 4,439,316 | A | 3/1984 | Kozima et al. |
| 4,478,211 | A | 10/1984 | Haines et al. |

(Continued)

FOREIGN PATENT DOCUMENTS

| CN | 1931419 A | 9/2005 |
| CN | 101448562 A | 6/2009 |

(Continued)

OTHER PUBLICATIONS

Shinko Pfaudler Co Ltd, English Abstract of JP 01111494 published Apr. 28, 1989.

(Continued)

Primary Examiner — Katherine Zalasky

(57) ABSTRACT

A gas sparger produces an intermittent flow of bubbles even if provided with a continuous gas flow. The sparger has a housing to collect a pocket of gas and a conduit to release some of the gas from the pocket when the pocket reaches a sufficient size. Optionally, a cover over an outlet from the conduit may break up or distribute the released gas. A large sparger for use with a commercial membrane module can comprise a plurality of smaller units.

6 Claims, 2 Drawing Sheets

(56) References Cited

U.S. PATENT DOCUMENTS

| | | | |
|---|---|---|---|
| 4,569,804 | A | 2/1986 | Murphy |
| 4,676,225 | A | 6/1987 | Bartera |
| 4,752,421 | A | 6/1988 | Makino |
| 4,789,503 | A | 12/1988 | Murphy |
| 4,828,696 | A | 5/1989 | Makino et al. |
| 4,906,363 | A | 3/1990 | Makino et al. |
| 4,911,838 | A | 3/1990 | Tanaka |
| 4,923,614 | A | 5/1990 | Engelbart |
| 5,169,781 | A | 12/1992 | Nojima et al. |
| 5,605,653 | A | 2/1997 | DeVos |
| 5,618,431 | A | 4/1997 | Kondo et al. |
| 5,620,891 | A | 4/1997 | Drummond et al. |
| 5,639,373 | A | 6/1997 | Mahendran et al. |
| 5,783,083 | A | 7/1998 | Henshaw et al. |
| 6,162,020 | A | 12/2000 | Kondo |
| 6,245,239 | B1 | 6/2001 | Cote et al. |
| 7,017,557 | B2 | 3/2006 | Rumpf |
| 7,294,255 | B2 | 11/2007 | Kondo |
| 7,867,395 | B2 | 1/2011 | Ekholm et al. |
| 7,879,229 | B2 | 2/2011 | Phagoo et al. |
| 2003/0178369 | A1 | 9/2003 | Eguchi et al. |
| 2005/0006308 | A1* | 1/2005 | Cote et al. ............. 210/636 |
| 2006/0201876 | A1 | 9/2006 | Jordan |
| 2007/0039888 | A1 | 2/2007 | Ginzburg et al. |
| 2007/0166171 | A1 | 7/2007 | Kondo |
| 2009/0194477 | A1 | 8/2009 | Hashimoto |
| 2010/0300968 | A1 | 12/2010 | Liu et al. |

FOREIGN PATENT DOCUMENTS

| | | |
|---|---|---|
| EP | 0937494 | 8/1999 |
| EP | 1119522 B1 | 4/2004 |
| EP | 1652572 B1 | 5/2006 |
| EP | 1897857 | 3/2008 |
| GB | 996195 A | 6/1965 |
| JP | 62262185 A | 11/1987 |
| JP | 62268838 A | 11/1987 |
| JP | 01104396 A | 4/1989 |
| JP | 01111494 A | 4/1989 |
| JP | 04265128 | 9/1992 |
| JP | 07-185270 A | 7/1995 |
| JP | 07185271 A | 7/1995 |
| JP | 0810589 A | 1/1996 |
| JP | 08141566 | 4/1996 |
| JP | 08312161 | 11/1996 |
| JP | 09-038470 A | 2/1997 |
| JP | 09220569 | 8/1997 |
| JP | 2003-340250 | 12/2003 |
| JP | 2004322100 A | 11/2004 |
| JP | 2006081979 | 3/2006 |
| WO | 9706880 A2 | 2/1997 |
| WO | 9828066 | 7/1998 |
| WO | 0021890 A1 | 4/2000 |
| WO | 2004050221 A1 | 6/2004 |
| WO | 2004056458 A2 | 7/2004 |
| WO | 2005105275 A1 | 11/2005 |
| WO | 2006029465 A1 | 3/2006 |
| WO | 2006066319 A1 | 6/2006 |
| WO | 2008144826 A1 | 4/2008 |
| WO | WO 2008/153818 * | 12/2008 |
| WO | 2011028341 A1 | 3/2011 |

OTHER PUBLICATIONS

Shinko Pfaudler Co Ltd, English Abstract of JP 01104396 published Apr. 21, 1989.

International Search Report and Written Opinion issued in connection with PCT/US2010/043926, Oct. 21, 2010.

Kurita Water Ind Ltd, English Abstract of JP 07185270 published Jul. 25, 1995.

Kurita Water Ind Ltd, English Abstract of JP 2004322100 published Nov. 18, 2004.

Kurita Water Ind Ltd, English Abstract of JP 07185271 published Jul. 25, 1995.

Murase et al., English Abstract of JP 09-038470 published Feb. 10, 1997.

China Petrochemical Corp., English Abstract of CN1931419 published Sep. 16, 2005.

Mini-Ject Above-Grade Ejector Lift Station, from http://smithandloveless.com/cgi-local/H2O/H2O.cgi?db+pumps& . . . , printed Jan. 28, 2009.

Kubota Corp, English Abstract of JP 09220569 published Dec. 25, 1997.

Aintetsuku:KK, English Abstract of JP 08312161 published Nov. 26, 1996.

Kubota Corp, English Abstract of JP 08141566 published Jun. 4, 1996.

Asahi Kasei Chemicals, English Abstract of JP2006081979 published Mar. 30, 2006.

Infilco Degremont, Infilco Cannon Mixer—Enhanced Sludge Mixing Technology, downloaded from http://www.degremont-technologies.com/IMG/pdf/INFLICO-CannonMixer-EN-US.pdf on Oct. 1, 2012.

Unofficial English Translation of Chinese Office Action is issued in connection with corresponding CN Application No. 201180049733.9 on May 26, 2014.

A PCT Search Report and Written Opinion is issued in connection with corresponding Application No. PCT/US2011/054530 on Apr. 27, 2012.

U.S. Appl. No. 12/905,701, filed Oct. 15, 2010, Cumin, Jeffrey, et al.

* cited by examiner

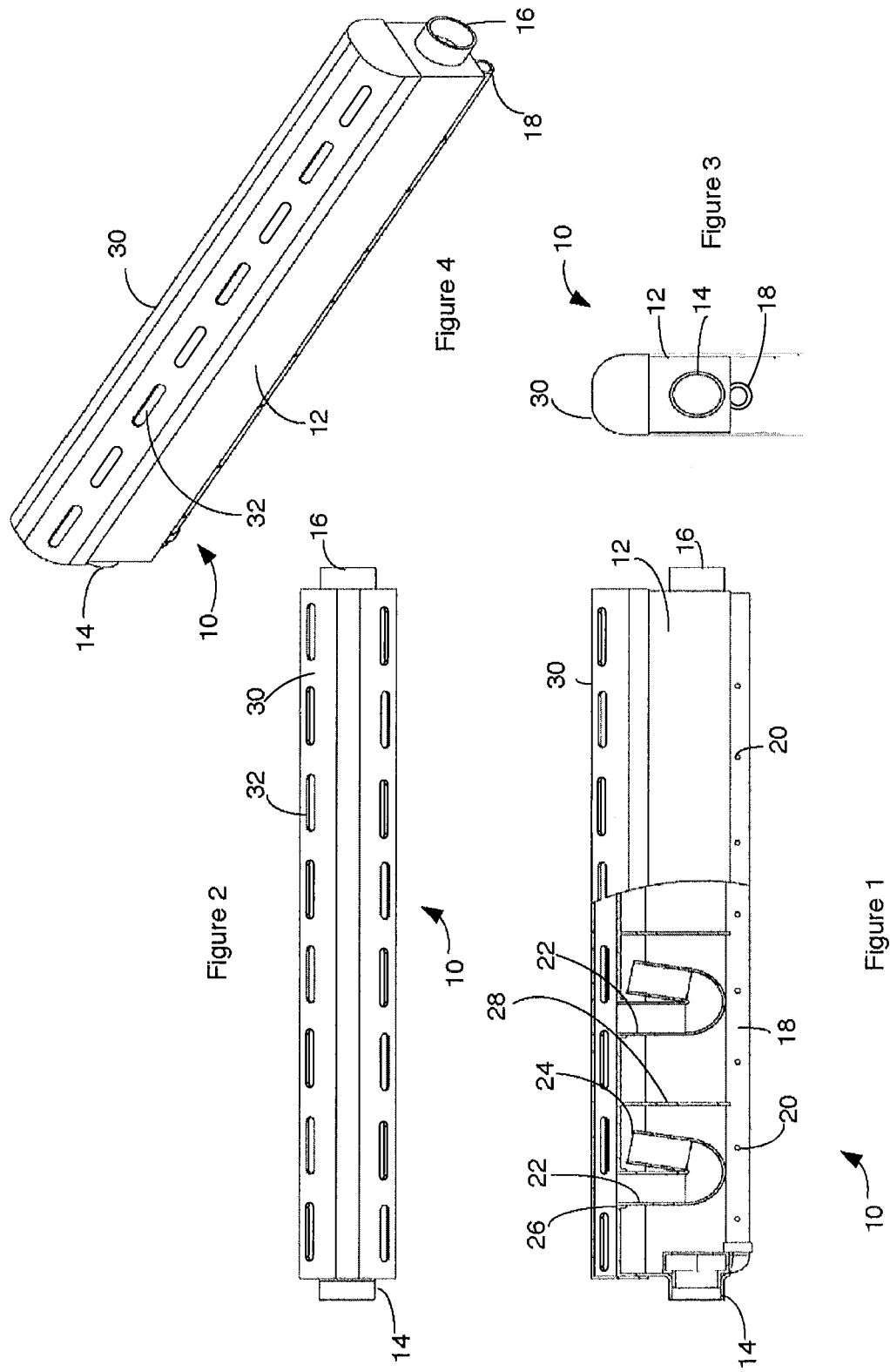

GAS SPARGER FOR AN IMMERSED MEMBRANE

FIELD

This specification relates to a gas sparger and to gas scouring to inhibit fouling of an immersed membrane.

BACKGROUND

The following background discussion is not an admission that anything discussed below is citable as prior art or common general knowledge.

International PCT publication WO/2000/021890 describes an aeration system for a submerged membrane module that has a set of aerators connected to an air blower, valves and a controller adapted to alternately provide a higher rate of air flow and a lower rate of air flow in repeated cycles to individual aerators. In an embodiment, the air blower, valves and controller, simultaneously provide alternating air flows to two or more sets of aerators such that while the total system air flow is constant, allowing the blower to be operated at a constant speed, each aerator receives a flow of air that varies over time. In some embodiments, the flow of air to an aerator occurs in repeated cycles of short duration. Transient flow conditions result in the tank water which helps avoid dead spaces and assists in agitating the membranes. WO/2000/021890 is incorporated herein in its entirety by this reference to it.

INTRODUCTION

The following discussion is intended to introduce the reader to the more detailed discussion to follow, and not to limit or define any claim.

The air cycling process described in WO/2000/021890 has proven to be very effective at reducing the amount of air or other gas, and therefore energy, required to operate an immersed membrane system. It was noted in WO/2000/021890 that rapid valve movements result in very large bubbles being created for a brief period of time, and that these very large bubbles might help inhibit membrane fouling. However, it was also noted in WO/2000/021890 that creating these large bubbles required producing undesirable pressure spikes in the aeration system. A gas sparger, alternately called an aerator, will be described below that produces an intermittent flow of bubbles even when provided with a continuous gas flow. The flow of bubbles can be in the form of short bursts of very large bubbles, but rapid valve movements are not required.

The sparger has a housing to collect a pocket of gas and a conduit to release at least some of the gas from the pocket when the pocket reaches a sufficient size. Optionally, a cover over an outlet from the conduit may distribute the released gas, and may also break up the gas into bubbles, or smaller bubbles, if the gas was initially released in a more nearly bulk form. A large sparger for use with a commercial membrane module or cassette can comprise a plurality of smaller units. Even if fed with a continuous supply of gas, the sparger produces discrete periods of bubble flow, optionally in the form of short bursts of large bubbles.

BRIEF DESCRIPTION OF THE FIGURES

FIG. 1 shows a partially sectioned side elevation view of a sparger.

FIG. 2 shows a top view of the sparger of FIG. 1.

FIG. 3 shows an end view of the sparger of FIG. 1.

FIG. 4 shows an isometric view of the sparger of FIG. 1.

DETAILED DESCRIPTION

Figure 5:
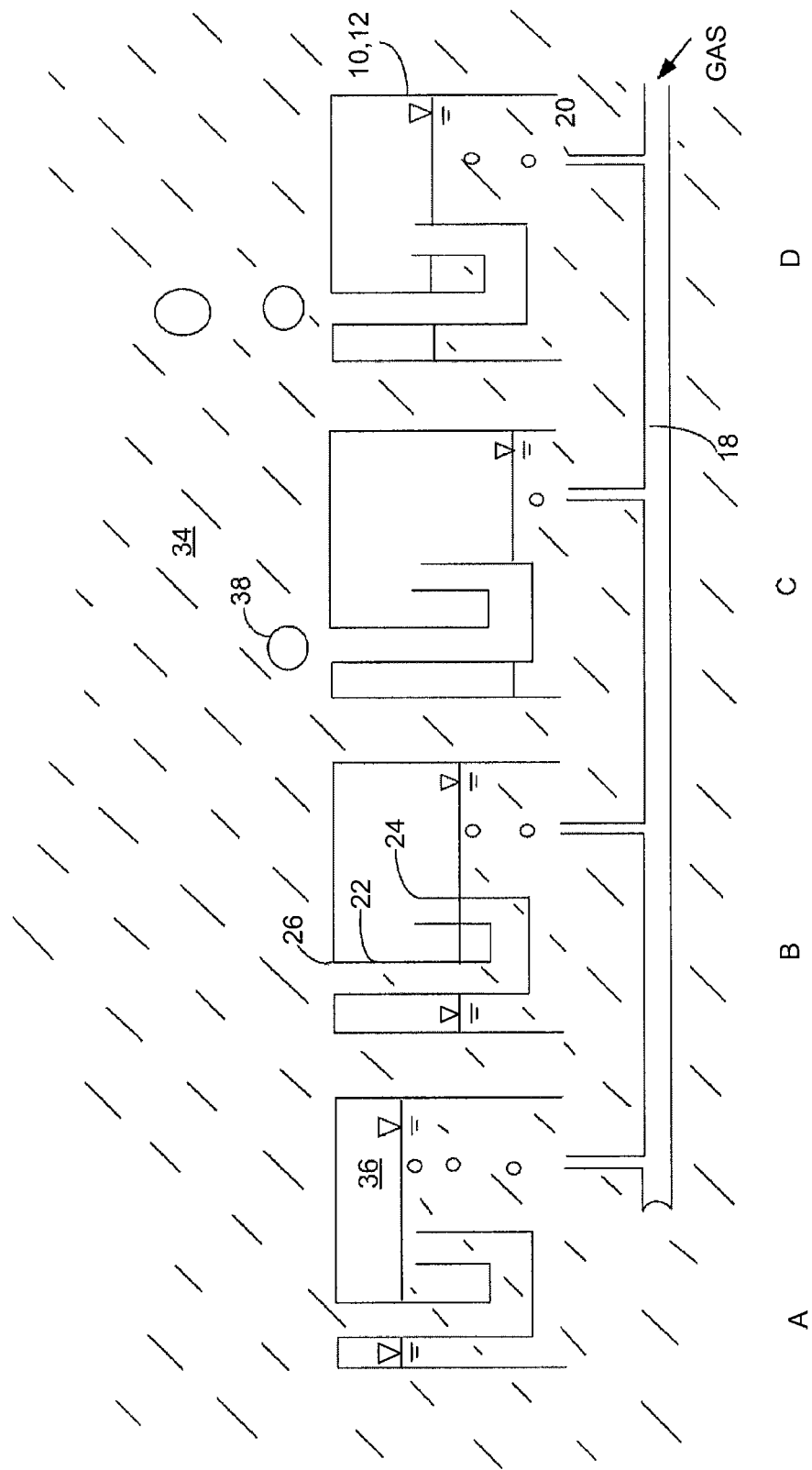
FIG. 5 shows a schematic side view of four spargers immersed in a liquid at various stages in an aeration process.

FIGS. 1 to 4 show a sparger 10 in various views. Sparger 10 has a housing 12 defining an interior chamber bounded by an upper surface. The housing 12 shown is elongated, with its length being more than twice its width, and has a generally inverted "U" cross section, although other shapes may also be used. The housing 12 shown has a connection 14 at one end. Connection 14 can be fit into or over a port in a gas supply manifold (not shown) to provide gas to the sparger 10 and to hold one end of the sparger 10 in a selected position immersed in a liquid. The other end of the sparger 10 may be held in a selected position immersed in a liquid by a pin 16 extending from the housing 12.

The connector 14 is connected to one or more distribution pipes 18. Distribution pipes 18 extend generally along the length of the sparger 10 and have gas outlets 20 along their length. The size of the gas outlets 20 may be made sufficiently small relative to the gas flow rate so as to (a) create a head loss that encourages an even distribution of gas flow from the gas outlets 20 even if the distribution pipe 18 is not exactly level and (b) cause a sufficient velocity of gas flow through the gas outlets 20 to inhibit liquid entry into the distribution pipe 18. The Distribution pipes 18 may be located near the bottom of sparger 10 as shown or at other elevations. For example, distribution pipes 18 may be located along the top of housing 12, with the outlets 20 in an area that always contains a pocket of gas. Further optionally, different parts of the housing 12 may receive gas from separate gas tubes connected to a gas supply manifold located further away from the housing 12.

The sparger 10 has a plurality of discharge conduits 22 along its length. Discharge conduits 22 have first outlets 24 in communication with an area inside and near the top of the housing 12, and second outlets 26 open to the outside of the housing 12. At least a portion of the conduit 22 extends downwards between the first opening 24 and the second opening 26. Another portion of conduit 22 extends upwards again before reaching the second opening 26. Gas leaving the housing 12 through the conduit 22 must pass through a low point in the conduit 22 between the first opening 24 and the second opening 26, as in the generally J or U shaped conduits 22 shown. Second opening 26 may have an area of 1 to 10 square cm or 3 to 6 square cm. The cross-sectional area of a pocket of gas in communication with a conduit 22 is preferably larger than the area of the second opening 26 by a factor of 10 or more, for example by a factor in the range of 20 to 35. As shown for example in FIG. 1, each discharge conduit 22 forms a closed channel between first outlet 24 and second outlet 26.

Adjacent conduits 22 are preferably separated from each other, for example by dividers 28. The dividers 28 prevent one conduit 22 from depleting a pocket of gas in housing 12 to the extent that gas is rarely or never discharged from another one of the conduits 22. With solid dividers 28 extending to below the lowest expected extent of a gas pocket in housing 12 as shown, gas pockets associated with different conduits 22 are fluidly separated from each other. The sparger 10 acts as if it is a number of distinct smaller spargers. Over a period of operation, the timing of gas discharges from different conduits 22 in a sparger 10 may vary or scatter such that gas is not discharged from each conduit 22 at the same time. However, the pattern of gas discharge from an individual conduit appears to follow a generally regular cycle having a short burst of gas followed by a period in which gas is not discharged, or is discharged in only small amounts.

A cover or distributor 30 may optionally be provided over the housing 12. Cover 30 receives gas from one or more discharge conduits 22 and discharges gas in the form of bubbles from holes 32 in the cover 30. Cover 30 may have a plurality of holes 32 per conduit 22 to disperse the gas flow over a larger horizontal area. The cover 30 may also break a burst of gas leaving conduit 22 into bubbles or smaller bubbles if desired. As shown, the cover 30 may have dividers generally aligned with dividers 18 in the housing 12 to keep a flow of bubbles near the conduit 22 that released the gas for those bubbles. Optionally, holes 32 may be distributed either along the length of the housing 12 or across the width of housing 12 or both to spread the flow of bubbles as desired for one or more immersed membrane modules intended to be scoured by the bubbles. A module may be located above the sparger 10 in a tank. Optionally, the tube sheet of a module having air passages through the tube sheet between the membranes can function as the cover 30.

Cover 30 shown snaps over the housing 12 without making a gas tight seal with the top of housing 12. However, in the embodiment shown, the housing 12 and cover 30 both have a dome shape in cross section such that a gap between the cover 30 and housing 12 is located below the top of housing 12. With this arrangement, gas does not escape through the gap between the cover 30 and housing 12 at the gas flow rates tested by the inventors. The volume contained within cover 30 is preferably small, for example about 50% or less, or 33% or less, of the volume of an associated air pocket in housing 12. This tends to maintain the short burst characteristics of the gas leaving a conduit 22.

The operation of a sparger 10 immersed in a liquid 34 is illustrated schematically in FIG. 5. Parts A, B, C and D of FIG. 5 show a sparger 10 at four different points in a sequence of events that occurs in the sparger 10 as a gas is fed into it. The sequence progresses from condition A to B to C to D and then returns to condition A and repeats for as long as a supply of a gas is provided to a sparger 10. In Part A of FIG. 5, a conduit 22 is flooded with liquid 34, although a pocket of gas 36 may be trapped in the housing 12. In Part B, the pocket of gas 36 grows in size as gas from distribution pipe 18 is collected in housing 12 and displaces liquid 34. Liquid 34 leaves the housing 12 through an opening to the bottom of the housing 12 and through conduit 22. In Part C, after the expanding pocket of gas 36 extends below the upper bound of a low point in conduit 12, a path is created for gas to flow from the pocket 36 and through the conduit 22, and gas is discharged outside of the housing 12, for example in bubbles 38. In Part D, gas continues to flow through the conduit 22, liquid 34 re-enters the housing 12 and the pocket 36 becomes smaller. Returning to Part A, the liquid 34 inside of the housing 12 eventually reaches the conduit 22, the conduit 22 floods, and gas flow through the conduit 22 stops. The process then repeats, producing discrete periods of gas discharge even when gas is supplied continuously. The periods of gas discharge tend to be near an average duration and frequency. However, the precise timing, volume and duration of a gas discharge may vary within a range around the average, for example, with waves or other movement of the liquid or the discharge of gas from other spargers 10.

FIGS. 1 to 4 are drawn to scale. The sparger 10 is 85 mm wide, 139 mm high and 770 mm long. These dimensions are given to provide an example of a workable sparger, but the invention is not limited to these dimensions. The sparger 10 shown was designed to replace an aerator tube normally provided below a cassette of ZeeWeed™ 500 membrane modules by GE Water and Process Technologies, and to use the same fittings. These modules are intended for immersed, suction driven operation. The module has many hollow fiber membranes with a total surface area of about 200 to 525 square feet. The membranes are oriented vertically between a pair of elongated potting heads. The modules are generally rectangular in plan view, having a length about the same as the length of the sparger 10. The modules are arranged into cassettes in which several modules placed side by side in a frame separated by vertical gaps between adjacent modules. One sparger 10 is placed about 1 to 10 cm below every second module and oriented parallel with the module. Holes 32 are positioned to direct bubbles into the gaps on either side of the module. Each sparger 10 provides bubbles to the both sides of the module above it, and to one side of the adjacent modules on both sides of that module. When fed with air at about 4 cubic feet per minute, the sparger 10 shown releases bursts of bubbles lasting for about 1 or 2 seconds about every 8 seconds. Increasing or decreasing the rate of gas flow to the sparger 10 has very little, if any, effect on the duration of the burst of bubbles, but decreases or increases the time between bursts. Dimensions, ratios of dimensions, gas flows and process parameters within a range of plus to minus 50% of the values provided in this document are expected be suitable for typical commercial immersed suction driven membrane applications but other dimensions, relative proportions and gas flow rates may also be useful. Other variations are also possible. For example, a square or circular sparger 10, optionally divided into sections appropriate for those shapes, may be used for modules of other shapes. Conduit 22 may be one of a variety of shapes that provide the required passage.

We claim:

1. An assembly comprising,
  A) an immersed membrane module having an elongated lower potting head; and,
  B) one or more of an elongated apparatus for providing gas bubbles in a liquid located below and parallel to the lower potting head of the immersed membrane module, each apparatus comprising,
    a) a housing defining a plurality of chambers spaced along the length of the apparatus and an opening below each chamber allowing communication between the inside of the chamber and the outside of the chamber;
    b) a conduit in each chamber, each conduit having a first opening inside of the chamber and a second opening open to the outside of the housing at an upper surface of the housing, and defining a closed channel having a portion that extends downwards from the first opening to a low point of the conduit and then upwards from the low point of the conduit to the second opening in a direction from the first opening to the second opening; and,
    c) a gas supply pipe extending along the length of the apparatus and having at least one outlet to discharge gas into each chamber, the outlets being below the upper boundaries of the low points of the conduits,
    wherein,
    d) each chamber is adapted to hold a pocket of the gas above an interface between the gas pocket and the liquid, the interface having a variable elevation ranging from at least a lower boundary of the first opening in the conduit to an upper boundary of the low point of the conduit.

2. The apparatus of claim 1 wherein the second opening of the conduit is at or above the first opening.

3. The apparatus of claim 1 further comprising a cover with a plurality of holes over the second opening of each conduit and below the lower potting head of the immersed membrane module.

4. The apparatus of claim 1 wherein the second openings have an area of 1-10 square cm.

5. The apparatus of claim 1 wherein the cross-sectional area of the second openings of the conduits is less than the horizontal cross-sectional area of the associated chambers by a factor of at least 10.

6. A sparger for an immersed membrane module comprising,
   a) an elongated housing having walls extending downwards from an upper part of the housing, the housing defining a plenum with an open bottom;
   b) a plurality of closed conduits generally located within and spaced along the length of the housing, each of the conduits having a first opening in communication with the interior of the housing, a second opening at an upper surface of the housing and a low point between the first and second openings;
   c) a plurality of dividers within the housing between the conduits, the dividers forming a plurality of chambers within the housing;
   d) a gas distribution pipe extending along the length of the housing having at least one outlet for discharging gas into each of the chambers; and,
   e) a cover with holes over the housing and above the second opening of one of the conduits, the cover containing a volume that is 50% or less of the volume contained in a chamber above the low point of the one of the conduits.

* * * * *